(12) United States Patent
Jewart et al.

(10) Patent No.: US 9,588,395 B2
(45) Date of Patent: Mar. 7, 2017

(54) OPTICAL WAVEGUIDE MODULATOR WITH AN OUTPUT MMI TAP

(71) Applicant: Lumentum Operations LLC, Milpitas, CA (US)

(72) Inventors: Charles M. Jewart, Enfield, CT (US); Karl Kissa, West Simsbury, CT (US)

(73) Assignee: Lumentum Operations LLC, Milpitas, CA (US)

( * ) Notice: Subject to any disclaimer, the term of this patent is extended or adjusted under 35 U.S.C. 154(b) by 0 days.

(21) Appl. No.: 14/731,931

(22) Filed: Jun. 5, 2015

(65) Prior Publication Data

US 2016/0357085 A1 Dec. 8, 2016

(51) Int. Cl.
  *G02F 1/035* (2006.01)
  *G02F 1/225* (2006.01)
  *G02F 1/015* (2006.01)
  *G02F 1/21* (2006.01)

(52) U.S. Cl.
  CPC ............ *G02F 1/2257* (2013.01); *G02F 1/015* (2013.01); *G02F 2001/0155* (2013.01); *G02F 2001/212* (2013.01); *G02F 2001/217* (2013.01)

(58) Field of Classification Search
  CPC .............................................. G02F 2001/217
  See application file for complete search history.

(56) References Cited

U.S. PATENT DOCUMENTS

| 5,134,681 A * | 7/1992 | Ratovelomanana ... G02B 6/122 385/129 |
| 5,777,763 A | 7/1998 | Tomlinson, III |
| 6,249,626 B1 | 6/2001 | Bergmann |
| 6,845,197 B2 | 1/2005 | Lam et al. |
| 6,856,735 B2 | 2/2005 | Chang et al. |
| 7,343,070 B2 | 3/2008 | Van Der Vliet et al. |
| 2003/0219915 A1* | 11/2003 | Sarathy ................ G02B 6/4214 438/14 |
| 2005/0025419 A1* | 2/2005 | Fish .................... G02B 6/12004 385/31 |

OTHER PUBLICATIONS

Soldano et al., "Planar Monomode Optical Couplers Based on Multimode Interference Effects", Journal of Lightwave Technology, vol. 10, No. 12 Dec. 1992, pp. 1843-1850.
Besse et al., "New 2x2 and 1x3 Multimode Interference Couplers with Free Selection of Power Splitting Ratios", Journal of Lightwave Technology, vol. 14, No. 10, Oct. 1996, pp. 2286-2293.
Vázquez et al., "Tolerance analysis for efficient MMI devices in silicon photonics", http://proceedings.spiedigitallibrary.org, Oct. 3, 2014, 7 pages.

* cited by examiner

*Primary Examiner* — Chad Smith
(74) *Attorney, Agent, or Firm* — Harrity & Harrity, LLP

(57) ABSTRACT

A planar optical waveguide circuit includes an optical modulator, such as that based on a Mach-Zehnder interferometer, that is followed by an in-line optical tap in the form of a 2×2 multi-mode interference coupler that is characterized a reduced tracking error as compared to Y-junction couplers.

20 Claims, 9 Drawing Sheets

OPTICAL WAVEGUIDE MODULATOR WITH AN OUTPUT MMI TAP

TECHNICAL FIELD

The present invention generally relates to optical waveguide devices, and more particularly relates to an optical waveguide modulator with an in-line output tap.

BACKGROUND

Optical waveguide modulators are well known in the art and are used in a variety of applications. For high bandwidth application, when intensity modulation at modulation rates in megahertz range and beyond is desired, the modulators are based on electro-optical materials incorporating voltage-controlled waveguides forming a Mach-Zehnder (MZ) interferometer structure, which enables to convert phase modulation of light propagating in the waveguides into an optical power modulation of a combined light at the output of the Mach-Zehnder structure. Such modulators are conventionally referred to as Mach-Zehnder (MZ) modulators. Many applications also require that the modulated light at the output of the MZ modulator is monitored, and both the amplitude of the modulation and its phase is accurately tracked. For that purpose, in-line optical taps may be used at the modulator output to tap off some of the modulated light to a monitoring photodetector. However, the accuracy with which conventional optical taps can track the time-variant optical signal at the output of the MZ modulators may be insufficient for some applications.

SUMMARY

Accordingly, the present disclosure relates to a planar optical waveguide circuit that includes an in-line optical tap in the form of a four-port optical coupler providing a reduced tracking error.

An aspect of the present disclosure provides a planar optical waveguide circuit, comprising a an optical waveguide modulator comprising an input waveguide for receiving input light and a modulator output waveguide for outputting modulated light, and an in-line optical waveguide tap optically coupled to the modulator output waveguide of the MZ modulator and configured for tapping off a fraction of the modulated light. The in-line optical tap comprises a multi-mode interference (MMI) coupler comprising first and second input ports and first and second output ports, and an unused waveguide coupled at one end thereof to the second input port of the MMI coupler. The modulator output waveguide is coupled to the first input port of the MMI coupler for receiving the modulated light from the optical waveguide modulator, and wherein the MMI coupler is configured to couple non-equal fractions of the received modulated light into the first and second output ports thereof.

According to a feature of the present disclosure, a second end of the unused waveguide may be terminated so as to avoid picking up any stray portion of the input or modulated light propagating in a substrate wherein the in-line optical tap is formed. The in-line optical waveguide tap and the optical waveguide modulator may be integrally formed in or upon a same substrate. The in-line optical waveguide tap may also be formed in a different substrate than the optical waveguide modulator, which may be butt-coupled to the optical waveguide modulator to receive the modulated light therefrom.

An aspect of the present disclosure provides an optical waveguide circuit that comprises a substrate, an optical waveguide modulator formed in or upon the substrate and comprising an input waveguide for receiving input light and a modulator output waveguide for outputting modulated light, and an in-line optical waveguide tap formed in or upon the substrate and configured to tap off a fraction of the modulated light for monitoring. The in-line optical tap comprises a 2×2 multi-mode interference (MMI) coupler comprising first and second input ports and first and second output ports, and an unused waveguide comprising a first end that connects to the second input port of the MMI coupler and a second end that is terminated so as to avoid picking up any stray portion of the input or modulated light propagating in the substrate. The modulator output waveguide is coupled to the first input port of the MMI coupler for receiving the modulated light from the optical waveguide modulator, and wherein the MMI coupler is configured to couple non-equal fractions of the received modulated light into the first and second output ports thereof.

An aspect of the present disclosure provides an optical waveguide circuit, comprising: at least one substrate; an optical waveguide modulator formed in or upon the at least one substrate and comprising an input waveguide for receiving input light and a modulator output waveguide for outputting modulated light; and an in-line optical waveguide tap formed in or upon the at least one substrate and configured to tap off a fraction of the modulated light for monitoring. The in-line optical tap comprises a multi-mode interference (MMI) coupler comprising first and second input ports and first and second output ports, and an unused waveguide comprising a first end that connects to the second input port of the MMI coupler and a second end that is terminated so as to avoid picking up any stray portion of the input or modulated light propagating in the at least one substrate. The modulator output waveguide is coupled to the first input port of the MMI coupler for receiving the modulated light from the optical waveguide modulator, and wherein the MMI coupler is configured to couple non-equal fractions of the received modulated light into the first and second output ports thereof.

BRIEF DESCRIPTION OF THE DRAWINGS

Embodiments disclosed herein will be described in greater detail with reference to the accompanying drawings which represent preferred embodiments thereof, in which like elements are indicated with like reference numerals, and wherein.

DETAILED DESCRIPTION

In the following description, for purposes of explanation and not limitation, specific details are set forth, such as particular optical circuits, optical circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention.

Furthermore, in the context of this specification, the terms 'disposed on/upon', 'located on/upon' and their equivalents are used to indicate relative position of two elements and encompass situations wherein two elements are in a direct physical contact or have one or more additional elements between them. The term "disposed directly on/upon" means herein that the two elements are in a direct physical contact. The terms "first", "second" and so forth are not intended to imply sequential ordering, but rather are intended to distinguish one element from another unless explicitly stated.

Figure 1:
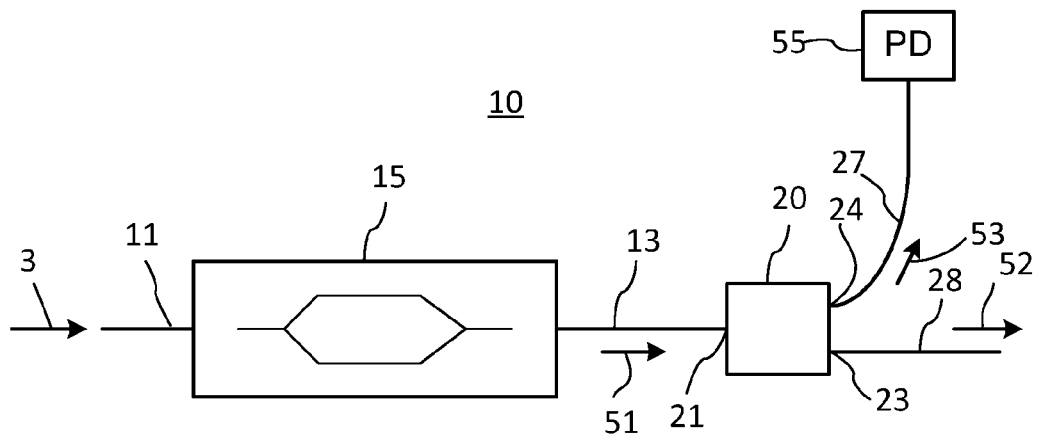
FIG. 1 is a schematic plan view of an optical waveguide modulation circuit including an in-line optical tap.

With reference to FIG. 1, there is schematically illustrated a planar optical waveguide circuit formed in or upon a substrate 10 wherein an optical waveguide modulator 15 with an input waveguide 11 and a modulator output waveguide 13 is followed by an in-line optical tap 20, which is configured to tap off a small fraction of the optical output of the optical waveguide modulator 15 to a photodetector (PD) 55 for monitoring. The optical waveguide modulator 15 may be embodied in a variety of ways, as would be evident to those skilled in the art, with some of possible embodiments thereof described hereinbelow by way of example. By way of example modulator 15 may be an electro-optic modulator based on a voltage-controlled MZ waveguide interferometer, and may be referred to herein as the MZ modulator 15 or simply as modulator 15. The in-line optical tap 20 has an input port 21 that connects to an output waveguide 13 of the modulator 15, and two output ports: a main output port 23 that connects to the main output waveguide 28 of the circuit, and a tap port 24 connected to a tap waveguide 27. In operation, input light 3 received in the input waveguide 11 travels first through the modulator 15, which modulates it in intensity and outputs modulated light 51, which is then split by the optical tap 20 in two non-equal portions 52 and 53, with the main portion 52 of the modulated light transmitted further along the main output waveguide 28 to a user, and a smaller tapped-off portion 53 passed from the tap port 24 along the tap waveguide 27 to the monitoring PD 55. By way of example, tap 20 may be configured to send 1-5% of the total output light out of the tap port 24, and 95-99% of the total output light out of the main output port 23.

Figure 2:
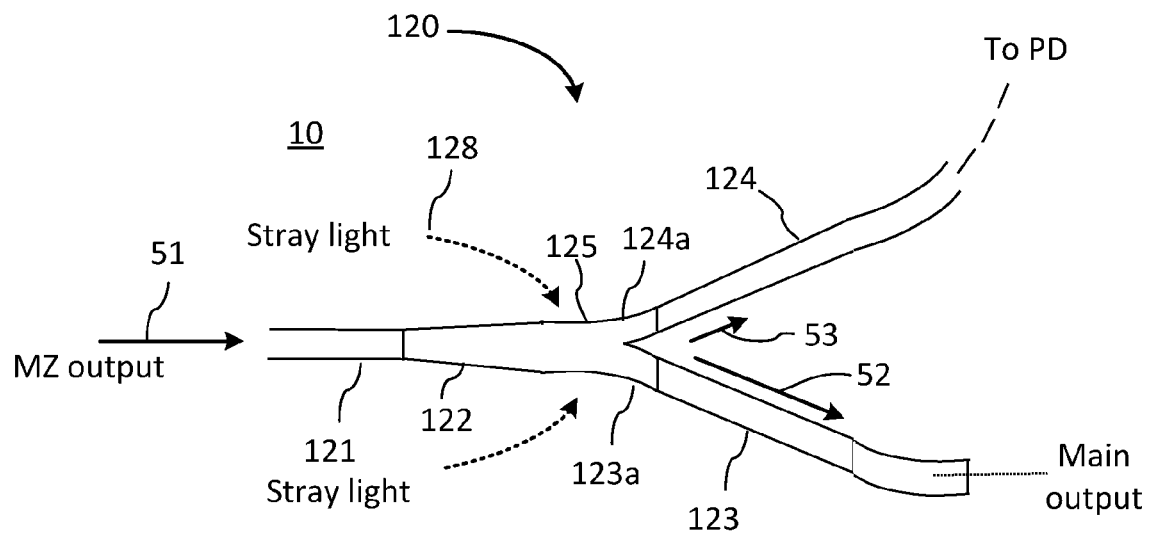
FIG. 2 is a schematic plan view of an in-line optical tap in the form of an asymmetric three-port Y-junction waveguide coupler.

Referring now to FIG. 2, there is illustrated a three-port waveguide coupler 120 that may be formed in or upon the substrate 10 to implement the optical tap 20. In this coupler, a single input waveguide 121, which may embody the input port 20 of the optical tap 20, connects to a waveguide Y-junction 125 with a taper 122, with two output waveguides 123, 124 embodying the main output port 23 and the tap port 24 of the optical tap 20, respectively. The waveguide Y-junction 125 may be asymmetric, with a wide end thereof that connects to the taper 122 splitting into a narrower waveguide portion or branch 124a and a wider waveguide portion or branch 123a, so that most of the input light propagating from the input waveguide 121 remaining with the wider output waveguide 123. The tap waveguide 124 gradually widens to a nominal waveguide width away from the Y-junction 125, with the tap ratio defined by the difference in width of the waveguide branches 124a and 123a at the Y-junction, as well as the center-to-center separation between the waveguide branches 124a and 123a at the Y-junction.

One drawback of using a three-port coupler such as the waveguide Y-junction 120 as the output optical tap 20 of the optical waveguide circuit of FIG. 1 is that, due to the input-output asymmetry that is inherent to the three-port device, the waveguide Y-junction 125 may pick up stray light 128 from the substrate 10 and guide it into the output ports 123, 124, adding it to the modulated light 51 received into the input waveguide 121. The stray light 128 may appear in the substrate 10, for example, due to imperfect coupling of the input light 3 into the input waveguide 11 of the modulator 15, for example when the light is coupled from an optical fiber, or due to optical loss by out-coupling or scattering into the substrate in the modulator 15 or at any point in the waveguide optical circuit prior to the optical tap 20. The tendency of the waveguide Y-junction couplers to pick-up stray light from the substrate may be understood on the basis of the principle of reversibility of light propagation and by noting that merging of two waveguides into a single waveguide of the same modality is not lossless. The asymmetric Y-junction coupler 120 of FIG. 2, although being a nominally three-port device, may act, substantially, as a 4-port optical coupler with the substrate on the input side of the coupler facing the MZ modulator acting as a virtual second input port. Accordingly, light radiated into the substrate by the circuit elements prior to the asymmetric Y-junction may be coupled into it as the stray light 128, mixing with the tapped light. The coherent addition of the stray light 128 into the tapped-off fraction 53 of the modulated light 51 in the tap waveguide 124 may lead to an undesired tracking error $\Delta V$ at the PD 55, as described hereinbelow with reference to FIG. 3.

Figure 3:
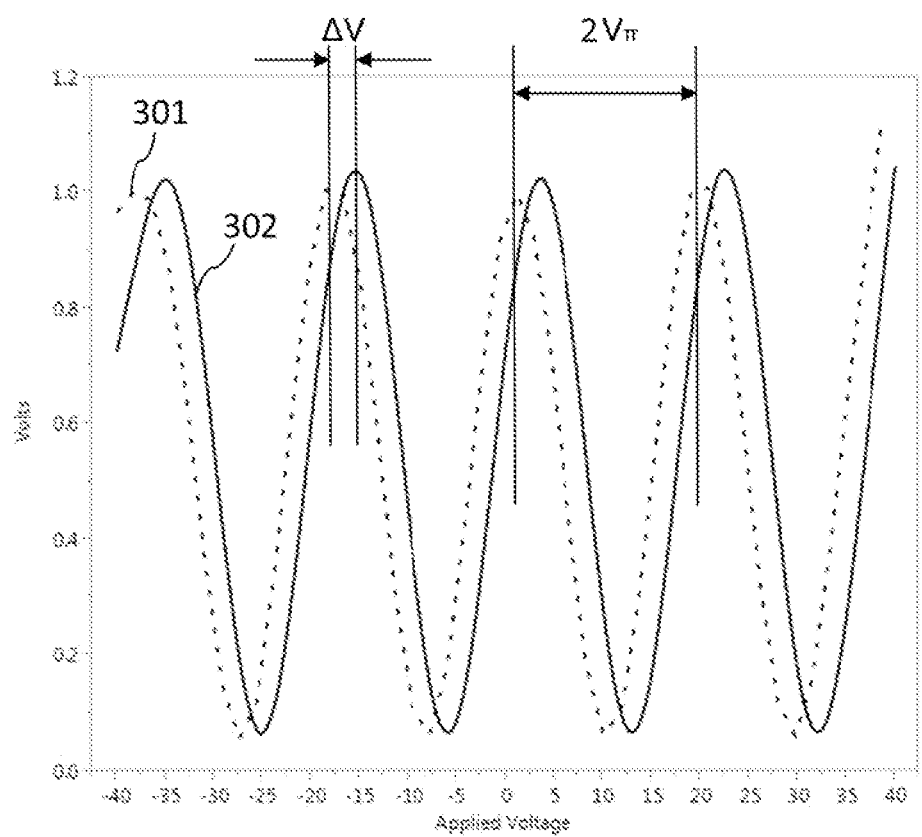
FIG. 3 is a graph showing exemplary modulator transfer curves as measured at the tap and main output ports of the in-line optical tap of FIG. 1.

FIG. 3 shows plots of optical intensity for the main optical output 52 of the optical waveguide circuit of FIG. 1 and the tapped-off output 53 as a function of a bias voltage V in the modulator 15 embodied as an MZ modulator, with the solid curve 302 corresponding to the main optical output 52, and the dashed curve 301 corresponding to the tapped-off light 53 routed to the PD 55. The curves 301, 302, which may be referred to as the transfer characteristics or transfer curves of the modulator 15, have been normalized to have approximately equal amplitude in the figure for convenience. Generally, the transfer characteristic of a conventional MZ modulator is a periodic function of the bias voltage V, with the difference in bias voltage for consecutive peaks commonly denoted as $2V\pi$. For an ideal tap, the intensity of the tapped-off light 33 should accurately track the intensity of the main optical output 32, so that the peaks of the transfer curves 301, 302 should occur at the same bias voltage V. For a non-ideal tap, there may be an offset $\Delta V$ between peaks in the transfer characteristic 301 as measured by PD 55 for the tapped-off light 33 and the main optical output 32; when normalized by $V\pi$, this offset may be referred to as a tap tracking error or simply the tracking error, and typically recorded as percent of $V\pi$. We found that conventional three-port optical taps using an asymmetric Y-junction such as that illustrated in FIG. 2 may be particularly prone to exhibiting tracking errors due to the contribution of the substrate light 128, which may be picked-up by such couplers and cause the shift of the transfer characteristic as measured by the monitoring PD 55 when coherently added to the tapped-off portion of the modulated light 51.

Figure 4:
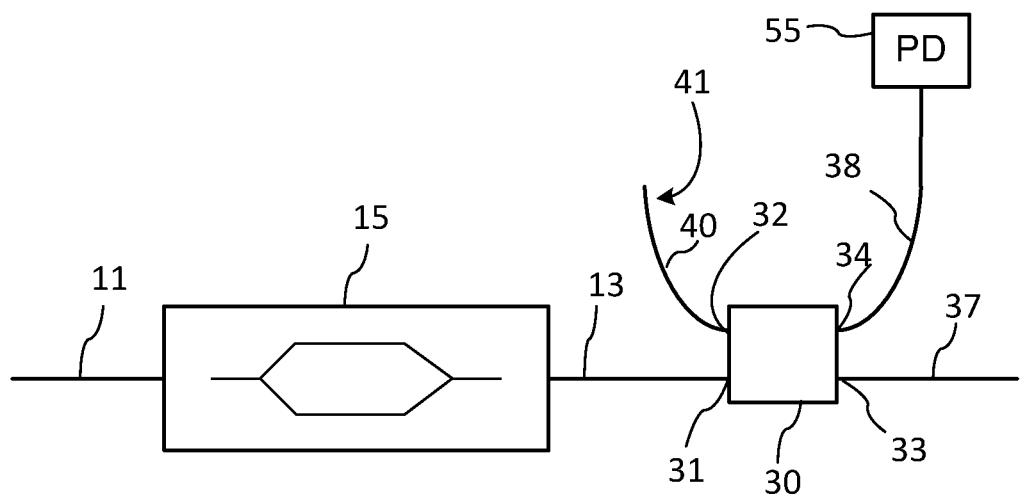
FIG. 4 is a schematic plan view of an optical waveguide modulation circuit with an in-line optical tap in the form of a 2×2 MMI coupler.

Referring now to FIG. 4, there is illustrated a modification of the optical waveguide circuit of FIG. 1 wherein the in-line optical tap is in the form of a multimode interference (MMI) coupler 30 Principles of operation of MMI couplers and methods of their design to achieve a desired power split ratio at the output are known in the art and are described, for example, in articles by L. B. Soldano et al. entitled "Planar Monomode Optical Couplers Based on Multimode Interference Effects" in J. of Lightwave Technology, Vol. 10, No. 12, December 1992, and by P. A. Besse et al. entitled "New 2×2 and 1×3 Multimode Interference Couplers with Free Selection of Power Splitting Ratios" J. of Lightwave Technology, Vol. 14, No 10, Oct. 1996, which are incorporated herein by reference. In the illustrated embodiment the MMI tap 30 is a four-port waveguide device that may be formed in the same substrate as the modulator 15, or in a separate substrate that is butt-coupled to the substrate of the modulator 15. In the illustrated embodiment, the MMI coupler 30, which will also be referred to as the 2×2 MMI coupler 30 or as the MMI tap 30. is a four-port device having two input ports 31, 32 and two output ports 33, 34. The modulator output waveguide 13 of the modulator 15 is coupled into the first input port 31 of the MMI tap 30, while the second input port 32 of the MMI tap 30 connects to a first end of an unused, or 'idle', waveguide 40, which second end 41 terminates so as to avoid picking up any stray portion of the input or modulated light 11, 51 propagating in the substrate, and without connecting to any source of light. In one embodiment the unused waveguide 40 may be routed to an optical termination, with the end portion 41 preferably facing away from the modulator 15. The two output ports 33, 34 of the MMI tap 30 connect to the main output waveguide 37 of the device and the tap waveguide 38 routed to the monitoring PD 55, respectively. Note that although the main optical output is shown in the figure to be from the bottom output port 33 of the MMI tap 30, the MMI tap 30 may be configured with either of the two output ports 33, 34 thereof as the tap port, for example by appropriate selection of the MMI length L, as the output power split ratio between the output ports 33, 34 is a periodic function of the MMI length.

Figure 5:
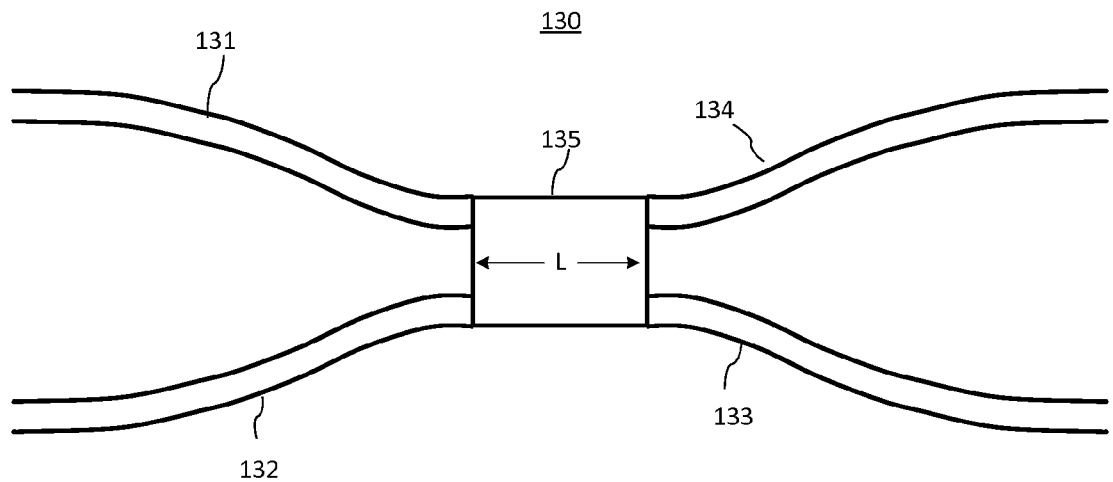
FIG. 5 is a plan view of an embodiment of the 2×2 MMI coupler with a rectangular MMI body.
Figure 6:
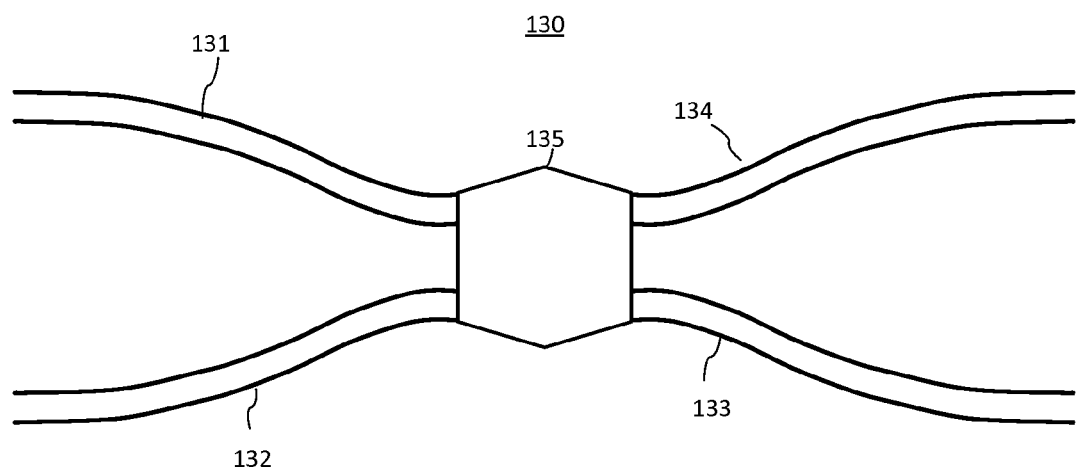
FIG. 6 is a plan view of an embodiment of the 2×2 MMI coupler with a tapered MMI body.

Turning now to FIG. 5, there is schematically illustrated the waveguide structure of a 2×2 MMI coupler 130 that may be used to implement the MMI tap 30 of FIG. 4. Two input waveguides 131, 132 and two output waveguides 133 and 134, which may serve as the input ports 31, 32 and the output ports 33, 34 of the MMI tap 30, connect to an MMI body 135 at opposing end thereof, and may have outer boundaries flush with the outer boundary of the MMI body 135. The MMI body 135 may be viewed as a section of a multi-mode waveguide that is typically designed to support at least two modes. The power split ratio between the output waveguides 133, 134 changes periodically with the length L of the MMI body 135, so the desired tap-off fraction may be obtained by adjusting the length and width of the MMI body 135 using known in the art methods. The MMI body 135 may be of a substantially rectangular shape as illustrated in FIG. 5; in other embodiments, the MMI body 135 may incorporate tapers and may widen towards the middle as illustrated in FIG. 6, or it may become more narrow in the middle than at the input/output sides thereof (not shown). The outer boundaries of the input and output waveguides 131-134 may also be non-flush or within the outer boundaries of the MMI body 135. By way of example, 2×2 MMI coupler 130 may be configured to send 1% to 5% of the total output light out of the tap output waveguide 134, and 95% to 99% of the total output light out of the main output waveguide 133. General principles and approaches to MMI coupler design are known in the art.

As known in the art, the 2×2 MMI coupler 130 uses the self-imaging property of multimode waveguides, by which an input field profile is reproduced by interference in single or multiple images at periodic intervals along the propagation direction in the multimode waveguide 135. Thus, the principle of operation of the 2×2 MMI coupler 130 is based on interference, so that the MMI tap 30 is at least in principle a loss-less device that is less prone to coupling light directly into the substrate or picking up the substrate light than the waveguide Y-junction coupler 120, provided that the unused waveguide 40 is routed to a proper optical termination or is otherwise terminated in a way that is substantially optically isolated from the substrate, i.e. is not prone to picking up stray light from the substrate. The second end 41 of the 'idle' or unused waveguide 40 may also be located away from the sources of stray light, such as optical splitters and combiners used to form MZ modulator 15, without the use of an optical termination.

Figure 7:
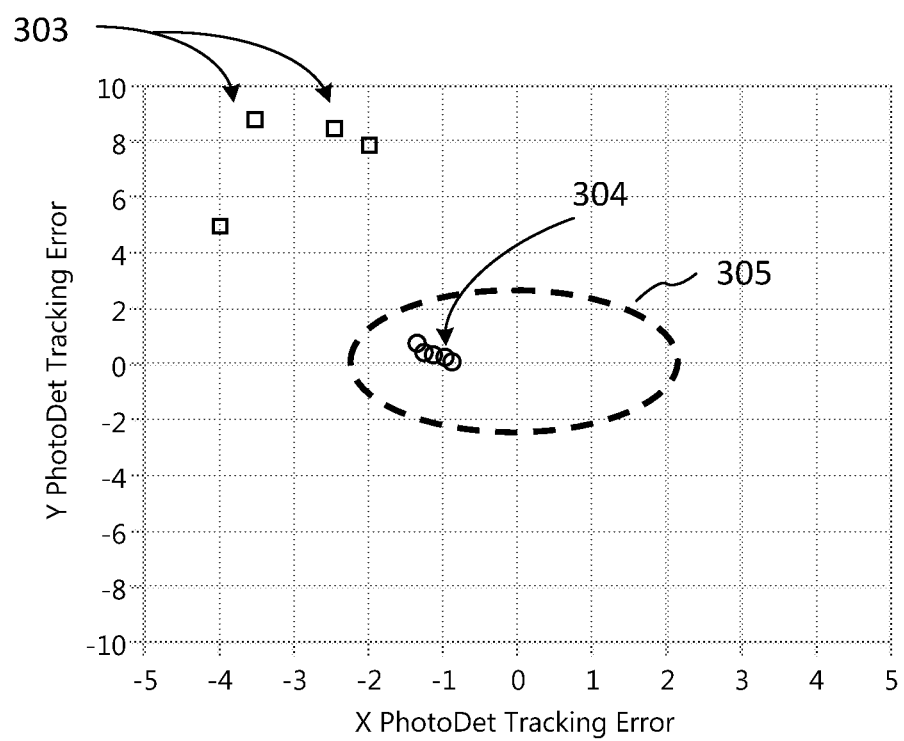
FIG. 7 is a graph showing tap tracking errors, as percent of Vπ, measured for dual-modulator devices with in-line optical taps based on three-port Y-junction waveguide couplers (squares) and 2×2 MMI couplers (circles)
Figure 8:
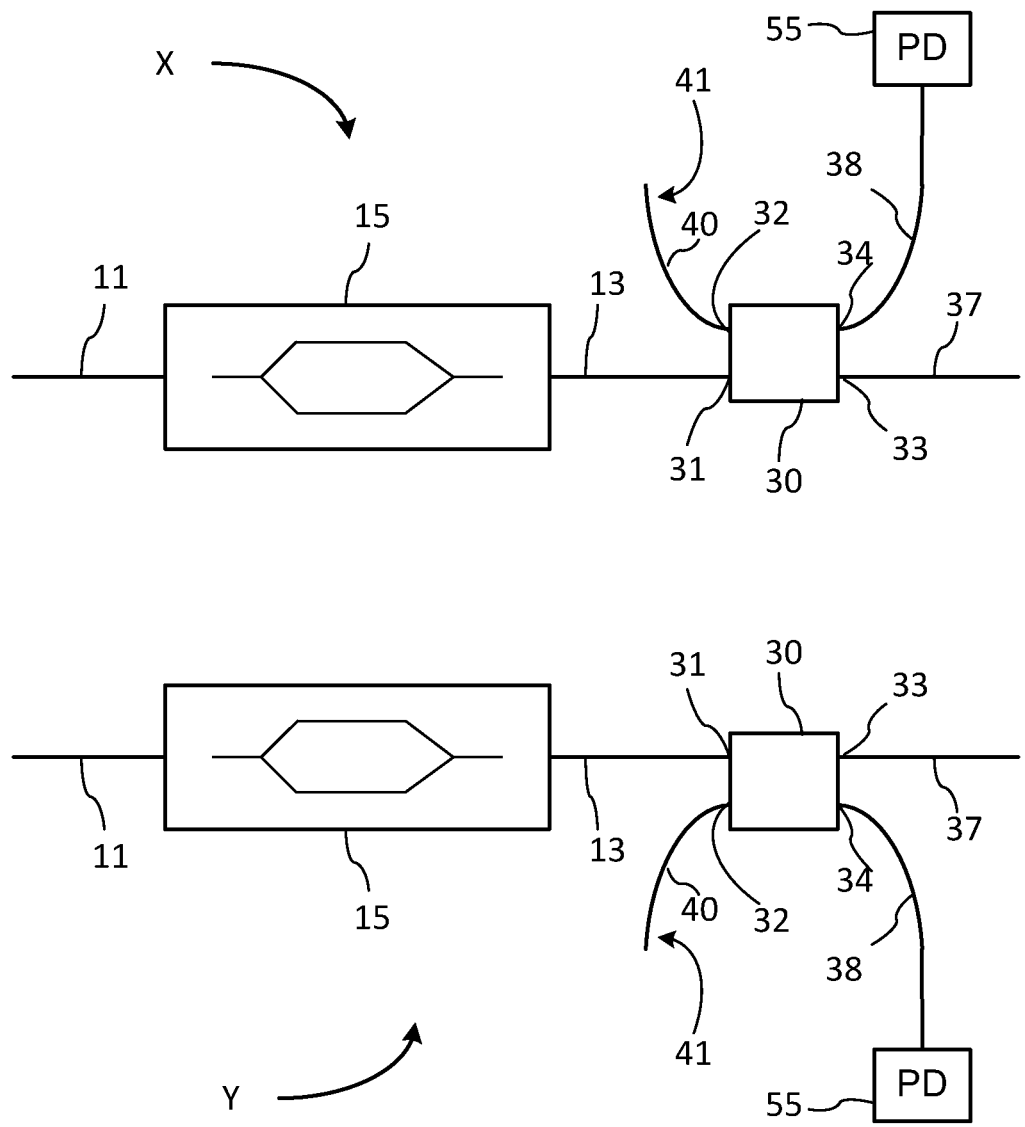
FIG. 8 is a schematic plan view of a dual-modulator device with in-line optical taps based on 2×2 MMI couplers.

Turning now to FIG. 7, there is shown a plot of measured tracking errors, as percent of $V\pi$, for in-line optical taps that follow two adjacent MZ modulators, labeled "X" and "Y", formed in the same substrate. The circles 304 represent data points obtained for two-modulator devices as schematically shown in FIG. 8, with the in-line optical taps 30 in the form of the 2×2 MMI couplers of the type illustrated in FIG. 4. The squares 303 are data points obtained for similar two-modulator devices (not shown) which are substantially identical to that illustrated in FIG. 8 but with the in-line optical taps 20 in the form of the Y-junction coupler of the type illustrated in FIG. 3. Different data points correspond to different device samples. Clearly, substituting the Y-junction couplers with the 2×2 MMI couplers for the in-line optical taps substantially reduces the modulator tracking error, and brings it within a desired range 305 indicated in FIG. 7 by a dashed oval/circle.

Figure 9:
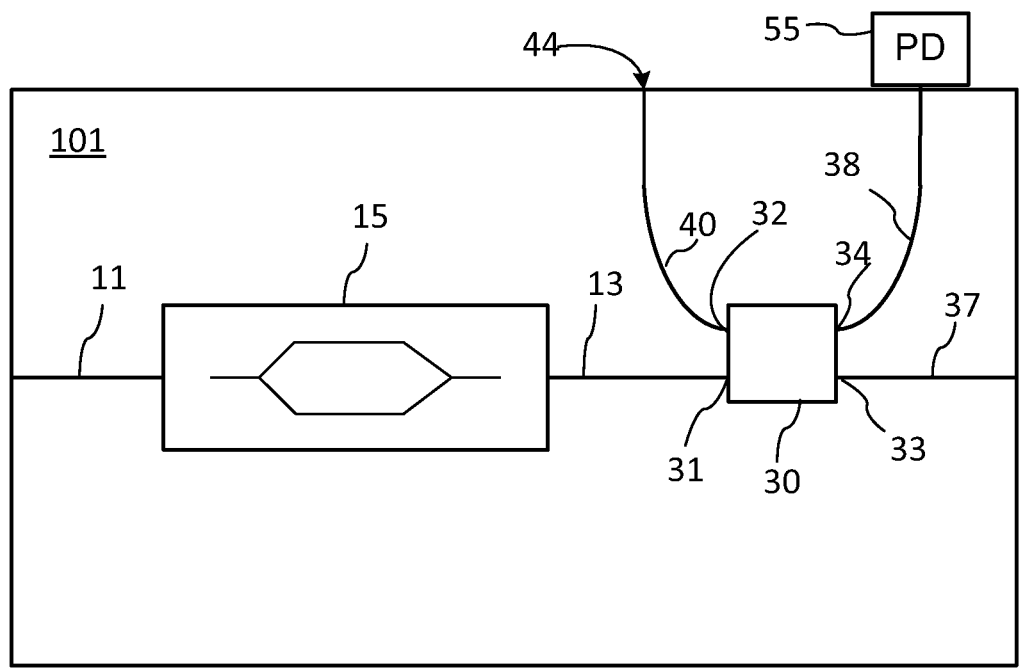
FIG. 9 is a schematic plan view of an optical waveguide modulation circuit with an MZ modulator and a 2×2 MMI in-line tap formed in a same substrate with an unused waveguide routed to an optical termination at a substrate edge.

With reference to FIG. 9, there is illustrated an embodiment of the optical waveguide circuit wherein the modulator 15 and the in-line optical tap in the form of the 2×2 MMI coupler 30 are formed in a same substrate 101. By way of example, the substrate 101 may be made of a Lithium Niobate (LiNbO₃) crystal, and all of the waveguides of this circuit may be formed in this substrate by titanium (Ti) in-diffusion or by any other suitable method as will be known to those skilled in the art. In other embodiments, the substrate 101 may be made of a semiconductor material including but not limited to Gallium Arsenide (GaAs), Indium Phosphide (InP), and silicon (Si), or it may also be a suitable polymer, or any other suitable material wherein waveguide modulators may be formed. The PD 55 may be any suitable photodetector that is sufficiently fast to track the modulation of light by the modulator 15, such as for example but not exclusively a PIN photodiode. The 'idle' or unused waveguide 40 may be routed away from the modulator 15 and the input/output waveguides thereof 11 and 13, with the distal waveguide end 44 terminating at a side edge of the substrate 101 away from the modulator 15 and the light receiving end of the input waveguide 11 so as to substantially eliminate, or at least reduce, the possibility of the idle waveguide 40 picking up stray light from the substrate 101.

Figure 10:
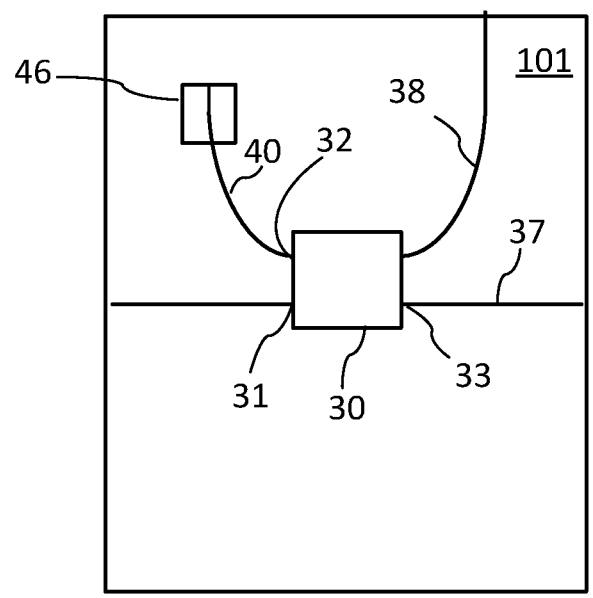
FIG. 10 is a schematic plan view of an 2×2 MMI in-line tap with an unused waveguide routed to an optical termination at the substrate interior.
Figure 11A:
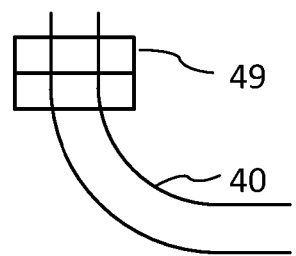
FIGS. 11a and 11b are schematic plan views of exemplary optical waveguide terminations in the form of etched pits or grooves.
Figure 11B:
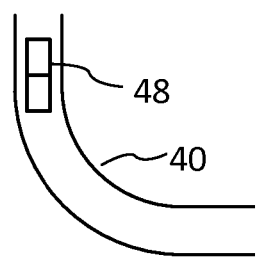

With reference to FIGS. 10, 11A and 11B, the idle waveguide 40 may be routed, or bent, away from the modulator 15 to terminate at a waveguide termination 46 that may be formed in the substrate 101 in a manner that substantially eliminates, or at least reduces, the possibility of the idle waveguide 40 picking up stray light from the substrate 101. The optical termination 46 of the unused waveguide 40 may be for example in the form of metal loading the top of the waveguide 40 to induce high optical loss therein as known in the art, or in the form of an etched pit or groove 49 or 48 that may be smaller or larger than the width of the waveguide 40 and which would scatter any guided light in the waveguide down or up, or by some combination of these methods, or by other means that attenuate the light without causing a reflection back into the waveguide 40 and without coupling to substrate modes that may propagate along the surface of the substrate where the waveguide is formed.

Figure 12:
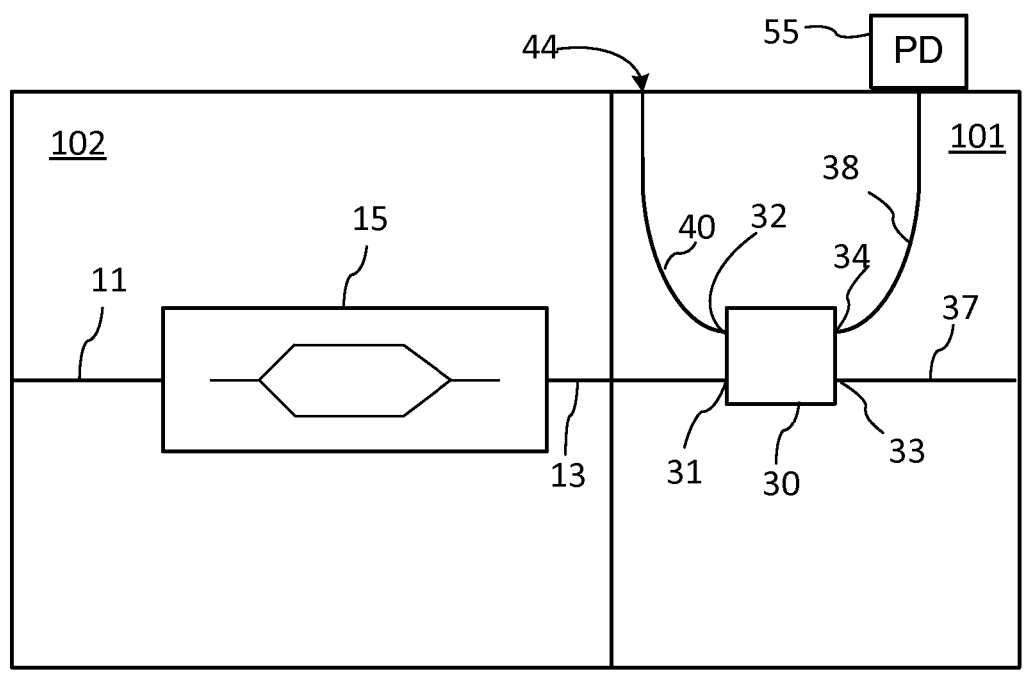
FIG. 12 is a schematic plan view of an optical waveguide modulation circuit with an MZ modulator and a 2×2 MMI in-line tap formed in two different butt-coupled substrates.

Turning now to FIG. 12, in one embodiment the MZ modulator 15 may be formed in a second substrate 102, while the MMI tap 30 may be formed in the first substrate 101 that is different from the second substrate 102, which may also be referred to as the modulator substrate. By way of example, the modulator substrate 102 may be made of LiNbO₃ or other suitable electro-optic material, while the substrate 101 may be silica-based as typically used in the art for Photonic Lightwave Circuits (PLC). The PLC substrate 101 may be butt-coupled to the modulator substrate 102 so that the output waveguide 13 of the modulator 15 is coupled to the input access waveguide 31 of the 2×2 MMI tap 30. Generally, such butt-coupling may lead to stray light from the modulator substrate 102 being coupled into the PLC substrate 101 wherein the in-line optical tap 30 is formed, potentially adding to the tracking error of the in-line optical tap if picked-up by the tap. Advantageously, the use of the 2×2 MMI coupler 30 as the in-line optical tap enables to substantially eliminate this in-coupling of the stray light from the substrate by the tap, thereby reducing the tracking error as was demonstrated in FIG. 7.

Figure 13:
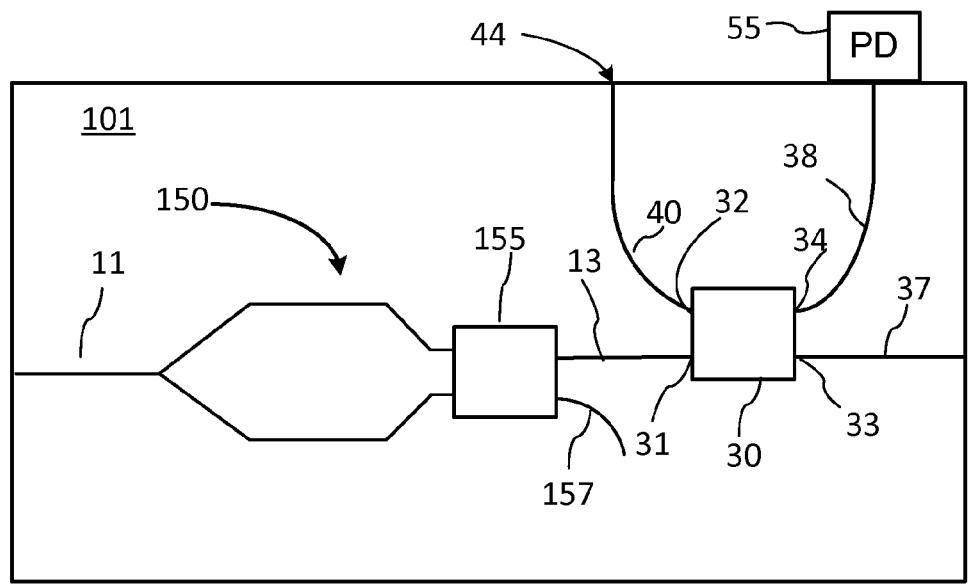
FIG. 13 is a schematic plan view of an optical waveguide modulation circuit with a single-stage MZ modulator and the 2×2 MMI in-line tap formed in a same substrate.

With reference to FIG. 13, there is illustrated an optical waveguide circuit that is similar to that shown in FIG. 9 but wherein the modulator 15 is in the form of a single-stage MZ modulator 150 with an output optical combiner 155 in the form of a second 2×2 MMI coupler, which may be designed to combine light from the two arms of the MZ modulator into the modulator output waveguide 13, with the second output waveguide 157 of the second MMI coupler 155 unused and routed to terminate away from the 2×2 MMI tap 30. Although in the illustrated embodiment the MZ modulator 150 and the 2×2 MMI tap 30 are formed in the same substrate, it will be appreciated that in other embodiments the 2×2 MMI tap 30 may be formed in a different substrate than the MZ modulator 150, or both of the 2×2 MMI couplers 155, 30 may be formed in one substrate while the arms of the MZ modulator 150 may be formed in another substrate.

Figure 14:
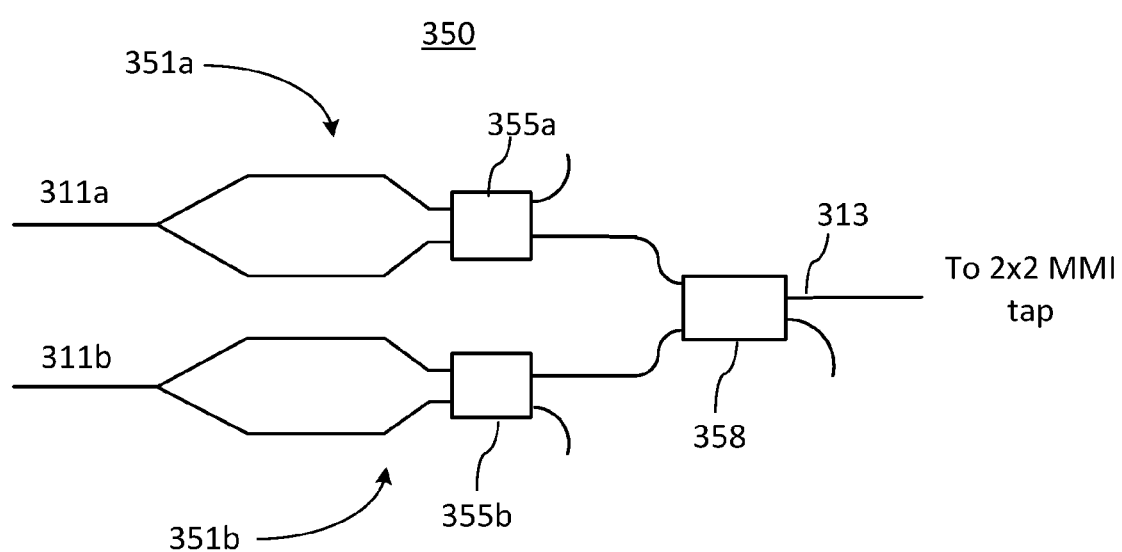
FIG. 14 is a schematic plan view of an exemplary quadrature MZ modulator that may be used in the optical waveguide modulation circuit of FIG. 9 or 12.

It will be appreciated that the modulator 15 of FIGS. 1, 4, 8, 9, and 12 may be embodied in a variety of other ways, and may use multi-stage and/or nested MZ interferometer structures as known in the art. By way of example, the modulator 15 may be in the form of a quadrature MZ modulator illustrated in FIG. 14, wherein two input optical waveguides 311a and 311b connect to two MZ modulators 351a and 351b having output optical combiners in the form of 2×2 MMI couplers 355a and 355b, respectively, each of which having one output waveguide unused and routed to an optical termination, and the other output waveguide coupled to input waveguides of a third optical combiner 358, which may also be in the form of a 2×2 MMI coupler, with one of the two output waveguides routed to a termination, and the main output waveguide 313 connecting to the input port of the 2×2 MMI tap 30. Such quadrature MZ modulators, which may also include an input waveguide splitter for delivering light into the input waveguides 311a and 311b from a single optical source, may be used for modulating and combining quadrature RF signals, commonly denoted as 'I' and 'Q', to form an output QAM signal as known in the art.

Advantageously, the use of a 2×2 MMI coupler as an in-line tap in an output circuit of an optical waveguide modulator enables reducing the tracking error of the optical tap by eliminating, or at least substantially reducing, one significant source of the tap tracking error that is present in Y-junction taps, namely the in-coupling of stray light from the substrate into the monitoring PD 55. MMI couplers also offer significant advantages over waveguide couplers based on evanescent coupling between two waveguides that are routed to be close side-by-side to each other along a selected length, as the tap ratio of the optical taps based on MMI couplers is significantly less sensitive to wavelength, temperature, and fabrication tolerances.

Figure 15:
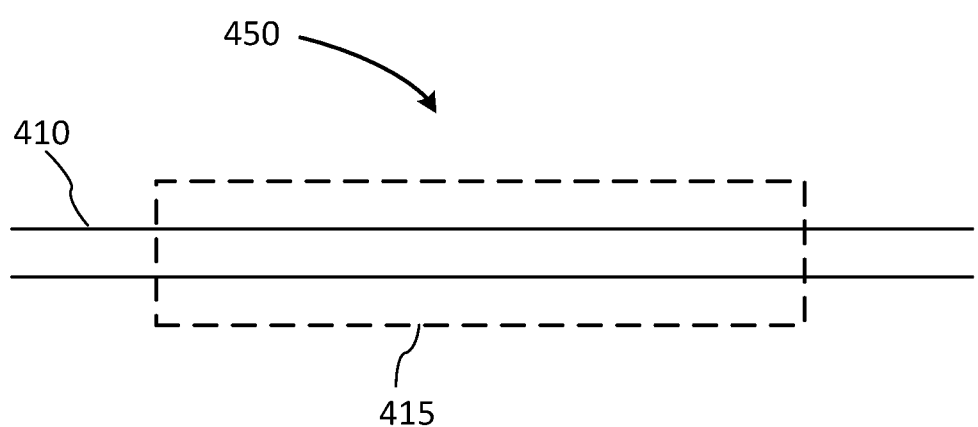
FIG. 15 is a schematic plan view of an exemplary electro-absorption modulator that may be used in the optical waveguide modulation circuit of FIG. 4, 9 or 12.

In the description above, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. For examples, the optical waveguide circuits described hereinabove may be fabricated in a variety of ways in or upon a variety substrates, including but not limited to lithium niobate, GaAs, InP, silicon, silica, silicon on silica, polymers etc. In another example, although embodiments described hereinabove were described with reference to MZ modulators, it will be appreciated that the in-line optical taps based on 2×2 MMI optical couplers may also be used after other types of waveguide modulators, such as for example optical absorption modulators. An example of an electro-absorption modulator that may be used as the modulator 15 is illustrated in FIG. 15; it includes an optical waveguide 410 formed in a semiconductor material with an electrode 415 disposed over it to control the optical absorption in the waveguide 410 as known in the art. Same or similar electro-absorption modulators may also be used in arms of an MZ structure in the modulator 15. Furthermore, the waveguides in the optical waveguide circuits described hereinabove may be formed within the substrates, for example using in-diffusion or implantation of suitable materials changing the refractive index of the substrate or by proton bombardment, or by depositing suitable waveguiding layers over the substrate, and may include ridge waveguides and buried waveguides as known in the art. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, the above-described exemplary embodiments are intended to be illustrative in all respects, rather than restrictive, of the present disclosure. Furthermore, each of the aforedescribed embodiments may include elements of the other embodiments. The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes.

We claim:

1. A planar optical waveguide circuit, comprising:
   an optical waveguide modulator comprising:
      an input waveguide configured to receive input light, and
      a modulator output waveguide configured to output modulated light; and
   an in-line optical waveguide tap configured to tap off a fraction of the modulated light for monitoring, the in-line optical waveguide tap comprising:
      a multi-mode interference (MMI) coupler comprising first and second input ports and first and second output ports, and
      an unused waveguide that is directly coupled, at a first end, to the second input port of the MMI coupler and terminated, at a second end, in a first substrate to avoid picking up any stray portion of the input light or the modulated light propagating in the first substrate;
   wherein the modulator output waveguide is optically coupled to the first input port of the MMI coupler to receive the modulated light from the optical waveguide modulator, and the MMI coupler is configured to couple non-equal fractions of the received modulated light into the first and second output ports.

2. The planar optical waveguide circuit of claim 1, wherein the in-line optical waveguide tap is formed in the first substrate.

3. The planar optical waveguide circuit of claim 1, wherein the second end of the unused waveguide is bent or routed away from the optical waveguide modulator.

4. The planar optical waveguide circuit of claim 1, wherein the MMI coupler is configured to:
   couple at least 80% of the modulated light received from the first input port into the first output port, and
   couple at least 1% of the modulated light received from the first input port into the second output port.

5. The planar optical waveguide circuit of claim 1, wherein the optical waveguide modulator is formed in or upon the first substrate integrally with the in-line optical waveguide tap.

6. The planar optical waveguide circuit of claim 1, wherein the optical waveguide modulator is formed in or upon a second substrate.

7. The planar optical waveguide circuit of claim 6, wherein the second substrate is butt-coupled to the first substrate.

8. The planar optical waveguide circuit of claim 6, wherein
   the first substrate comprises one of:
   Silicon (Si),
   Silica ($SiO_2$), or
   Silica on Silicon, and
   the second substrate comprises one of:
   lithium niobate ($LiNbO_3$),
   indium phosphide (InP),
   silicon (Si), or
   gallium arsenide (GaAs).

9. The planar optical waveguide circuit of claim 1, wherein the first substrate comprises one of:
   lithium niobate ($LiNbO_3$),
   indium phosphide (InP),
   gallium arsenide (GaAs),
   Silicon (Si), or
   Silica ($SiO_2$).

10. The planar optical waveguide circuit of claim 1, wherein the MMI coupler comprises an MMI region of a rectangular shape.

11. The planar optical waveguide circuit of claim 1, wherein the MMI coupler comprises an MMI region of a diamond-like shape.

12. The planar optical waveguide circuit of claim 1, wherein the optical waveguide modulator comprises a Mach-Zehnder (MZ) modulator.

13. The planar optical waveguide circuit of claim 1, wherein the optical waveguide modulator comprises an absorption modulator.

14. The planar optical waveguide circuit of claim 1, wherein the second end of the unused waveguide is terminated at an optical termination.

15. The planar optical waveguide circuit of claim 14, wherein the optical termination comprises metal loading.

16. The planar optical waveguide circuit of claim 14, wherein the optical termination comprises a pit or groove etched across at least a portion of the unused waveguide.

17. An optical waveguide circuit, comprising:
   a substrate;
   an optical waveguide modulator formed in or upon the substrate and comprising an input waveguide for receiving input light and a modulator output waveguide for outputting modulated light; and an in-line optical waveguide tap formed in or upon the substrate and configured to tap off a fraction of the modulated light for monitoring, the in-line optical waveguide tap comprising:
- a multi-mode interference (MMI) coupler comprising first and second input ports and first and second output ports, and
- an unused waveguide comprising a first end that directly connects to the second input port of the MMI coupler and a second end that is terminated, in the substrate, so as to avoid picking up any stray portion of the input or modulated light propagating in the substrate;

wherein the modulator output waveguide is coupled to the first input port of the MMI coupler for receiving the modulated light from the optical waveguide modulator, and the MMI coupler is configured to couple non-equal fractions of the received modulated light into the first and second output ports.

18. The optical waveguide circuit of claim 17, wherein the optical waveguide modulator comprises an absorption modulator.

19. The optical waveguide circuit of claim 17, wherein the optical waveguide modulator comprises a Mach-Zehnder (MZ) modulator.

20. A method comprising:

receiving, by an optical waveguide modulator, input light;

outputting, by the optical waveguide modulator, modulated light; and tapping off, by an in-line optical waveguide tap, a fraction of the modulated light for monitoring, wherein the in-line optical waveguide tap comprises:
- a multi-mode interference (MMI) coupler comprising first and second input ports and first and second output ports, and
- an unused waveguide that is directly coupled, at a first end, to the second input port of the MMI coupler and terminated, at a second end, in a first substrate to avoid picking up any stray portion of the input light or the modulated light propagating in the first substrate, the modulator output waveguide is optically coupled to the first input port of the MMI coupler to receive the modulated light from the optical waveguide modulator, and the MMI coupler is configured to couple non-equal fractions of the received modulated light into the first and second output ports.

\* \* \* \* \*